United States Patent [19]
Murugan

[11] Patent Number: 5,181,169
[45] Date of Patent: * Jan. 19, 1993

[54] BI-DIRECTIONAL PWM CONVERTER

[75] Inventor: Muthu K. Murugan, Howell, N.J.

[73] Assignee: Allied-Signal Inc., Morris Township, Morris County, N.J.

[ * ] Notice: The portion of the term of this patent subsequent to Aug. 18, 2009 has been disclaimed.

[21] Appl. No.: 793,045

[22] Filed: Nov. 15, 1991

[51] Int. Cl.$^5$ .......................................... H02M 3/335
[52] U.S. Cl. ........................................ 363/17; 363/26; 363/133; 323/222
[58] Field of Search .............................. 363/17, 24–26, 363/127, 132–134; 323/222; 318/376, 379

[56] References Cited
U.S. PATENT DOCUMENTS

| | | | |
|---|---|---|---|
| 4,277,692 | 7/1981 | Small | 363/97 |
| 4,600,984 | 7/1986 | Cohen | 363/97 |
| 4,736,151 | 4/1988 | Dishner | 323/222 |
| 4,860,185 | 8/1989 | Brewer et al. | 363/41 |

Primary Examiner—Steven L. Stephan
Assistant Examiner—Adolf Berhane
Attorney, Agent, or Firm—Donald B. Paschburg; Howard G. Massung

[57] ABSTRACT

A bi-directional converter offers power conversion between both 270 volts to 28 volts and 28 volts to 270 volts. The converter utilizes common magnetic components such as a transformer and a filter inductor and dual function built/in diodes across transistors. The converter also utilizes a bridge converter, a push-pull converter, and a boost converter.

16 Claims, 3 Drawing Sheets

BI-DIRECTIONAL PWM CONVERTER

BACKGROUND OF THE INVENTION

1. Field of the Invention

The present invention relates to power converters and more particularly to converting power and permitting power flow in two directions.

2. Description of the Prior Art

There are a variety of converter designs which offer power conversion between 270 volts to 28 volts or 28 volts to 270 volts. A typical aircraft utilizes two separate converters, one for 270 volt to 28 volt conversion and another converter for 28 volt to 270 volt conversion. The use of two converters increases complexity and decreases the reliability of aircraft power converters. It is an object of the present invention to combine 270 volt to 28 volt and 28 volt to 270 volt conversion therefore taking advantage of the common components of individual converters.

SUMMARY OF THE INVENTION

The bi-directional pulse width modulator (PWM) converter of the present invention permits power flow in two directions. The bi-directional converter utilizes common magnetic components such as a transformer and a filter inductor and dual function built-in diodes across transistors. The circuitry of the bi-directional converter comprises a bridge converter, a push-pull converter, a transformer, a boost converter and a filter inductor. The bi-directional converter supplies 270 VDC power when power is lost at the 270 VDC bus. The power is sourced from the battery until the 270 VDC generator power is restored.

DETAILED DESCRIPTION OF THE INVENTION

The bi-directional PWM converter of the present invention provides power conversion between 270 VDC to 28 VDC to 270 VDC. The 270 VDC power is supplied to an aircraft when power is lost at the 270 VDC bus. The power is sourced from the battery until the 270 VDC generator power is restored. During aircraft operation, the bi-directional converter of the present invention operates in a standby mode, therefore not transferring power in either direction.

A typical embodiment of the bi-directional converter has the following characteristics. The bi-directional converter utilizes common magnetic components such as a transformer and filter inductor for 270 V/28 V or 28 V/270 V conversion. Diodes that are installed across transistors serve dual functions. During input mode, the diodes function as flywheeling diodes and during output mode, the diodes function as rectifiers. The diodes installed across transistors of the bridge converter are built in. The filter inductor also performs dual functions. In the output mode the filter attenuates output ripple and in the input mode the filter reduces the reflected back harmonic current into the source.

Figure 1:
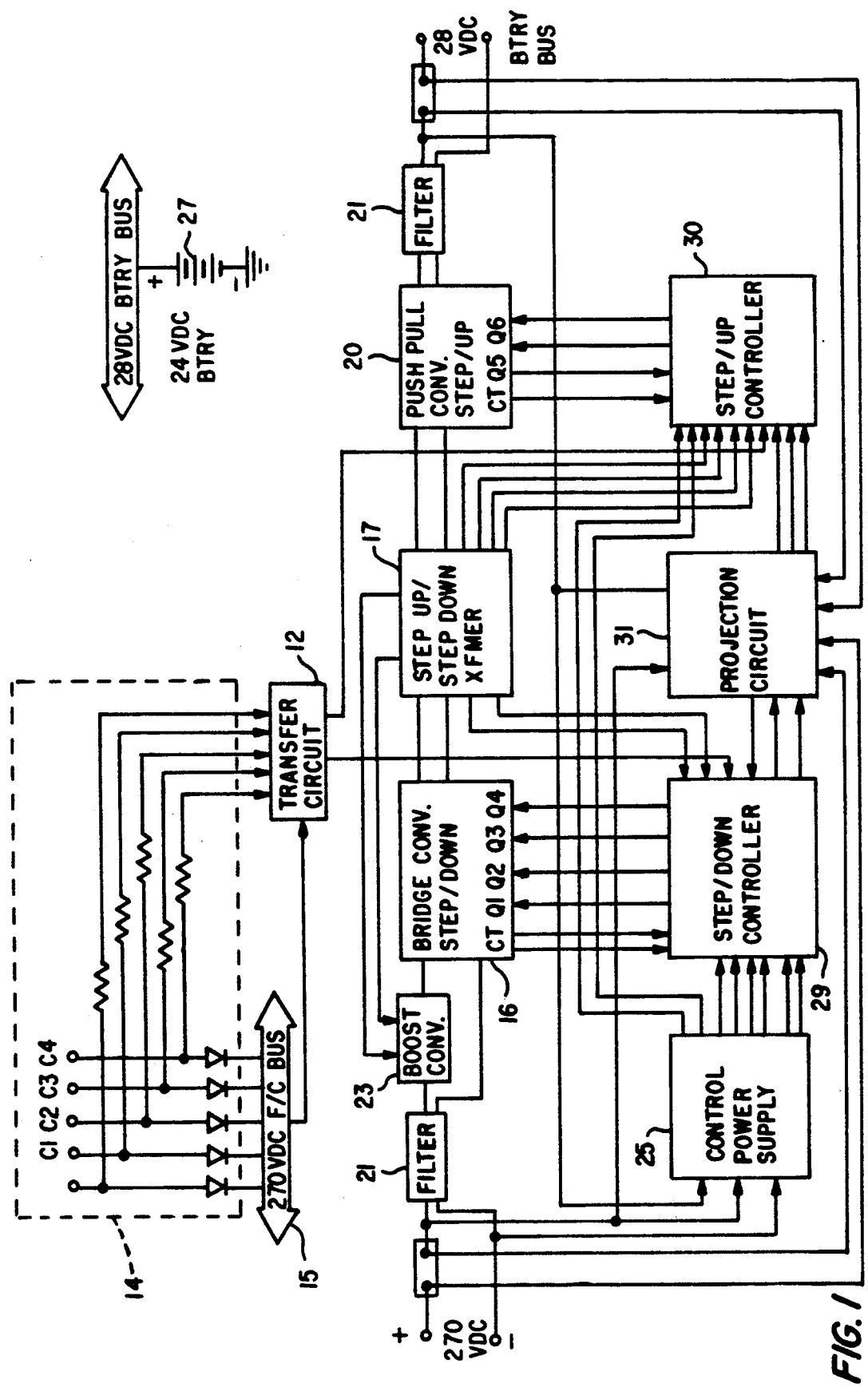
FIG. 1 illustrates a block diagram of one embodiment of the present invention.

FIG. 1 illustrates a block diagram of one embodiment of the present invention. The conversion mode (270 VDC to 28 VDC to 270 VDC) of the bi-directional converter is automatically selected by the transfer circuit 12 based on various operating conditions. As illustrated in FIG. 1 the transfer circuit 12 is connected to the 270 VDC generator 14 which is also connected to the 270 VDC bus 15.

For 270 VDC to 28 VDC conversion the 270 VDC input is derived from 270 VDC generator 14. The conversion is accomplished through bridge converter 16, step down transformer 17, and the flywheeling diodes associated with push-pull converter 20. High voltage MOSFET power transistors are used as switching devices in bridge converter 16. The operating frequency of bridge converter 16 is selected based on the transistors selected for bridge converter 16 and the power level required. Filter inductor 21, connected to push-pull converter 20 reduces the ripple voltage in the output. Boost converter 23 is inactive in this mode of operation. Step/down controller 29 is employed to regulate the output voltage, monitor transistor peak current and with protection circuitry 31, provides short circuit protection.

For 28 VDC to 270 VDC conversion, the input to the bi-directional converter is derived from the 24 V, battery 27. The bi-directional converter provides uninterruptible power to 270 VDC bus 15 in the event of failure of all the 270 VDC generators. Once 270 VDC generator power is restored, the conversion process reverses. The conversion is accomplished through push-pull converter 20, step-up transformer 17, the flywheel diodes associated with bridge converter 16 and boost converter 23. In this embodiment of the invention, MOSFET power transistors are used as switching devices in push-pull converter 20. Since the input voltage during 28 V/270 V conversion can be as low as 23 volts due to the internal resistance of battery 27 during heavy loads or low charge levels, the voltage generated in the common high voltage winding (33 of FIG. 2) of transformer 17 is insufficient to maintain 270 VDC±5%. For this reason, a boost winding (35 of FIG. 2) is added in transformer 17 and boost converter 23 rectifies the boost voltage and sums it with the bridge converter output in order to maintain 270 VDC±5%. Step/up controller 30 is employed to regulate the output voltage, monitor transistor peak current and with protection circuitry 31, provides short circuit protection.

Two separate controllers, step/down controller 29 and step/up controller 30, are used to control bridge converter 16 and push-pull converter 20 independently even though a common controller is feasible. This is due to the fact that the two independent controllers enhance the reliability of the equipment. Step/down controller 29 regulates the 28 VDC battery bus and step/up controller 30 regulates the 270 VDC bus. The controllers use current mode control techniques for the control of the bridge and push-pull converters. The advantages of utilizing the controllers are; peak current through the transistors is monitored and limited every cycle, overcurrent limiting can be obtained by limiting the maximum value of the error signal, and symmetry correction to minimize the DC components of transformer 17 is performed automatically.

Figure 2:
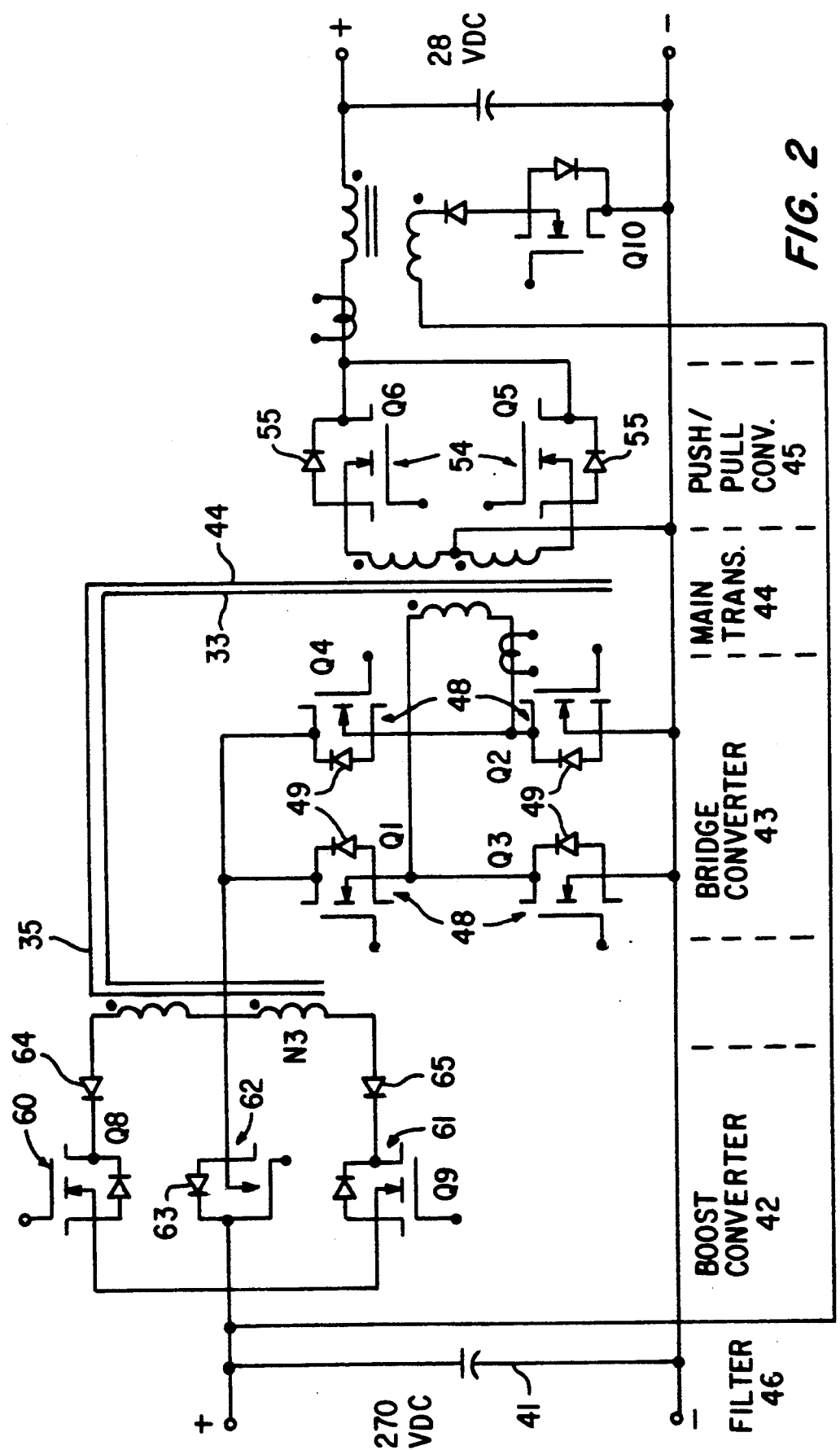
FIG. 2 illustrates a circuit diagram of one embodiment of the present invention.

FIG. 2 illustrates the power circuitry of one embodiment of the bi-directional converter of the present invention. The bi-directional converter comprises bridge converter 43, boost converter 42, transformer 44, push-pull converter 45 and filter 46.

Bridge converter 43 is designed for 270 VDC to 28 VDC conversion in view of the high voltage and power level to be handled. The switching elements of bridge converter 43 are MOSFET power transistors (Q1-Q4) 48. Each transistor contains built-in diode 49 for flywheeling action. These diodes serve a dual purpose. They perform flywheel functions during 270 V/28 V conversion and serve as bridge rectifiers during 28 V/270 V conversion. Current transformer 58 provides a current sense signal to step/down controller (29 of FIG. 1) which regulates the 28 VDC output during 270 V/28 V conversion.

Push-pull converter 45 is designed for 28 V/270 V conversion in view of complexity, efficiency and the power level to be handled. The switching elements of push-pull converter 45 are MOSFET power transistors Q5, 53 and Q6, 54. Dual purpose diodes 55 are added to push-pull converter 45. They perform a flywheel function during 28 V/270 V conversion and revert to their role as full wave push-pull rectifiers during 270 V/28 V conversion. Current transformer 57 provides a current sense signal to step/up controller (30 of FIG. 1) which regulates the 270 VDC output during 28 V/270 V conversion.

A single power transformer 44 is utilized in the bi-directional converter of the present invention. When the converter unit operates as a 270 V/28 V converter, the transformer acts as a step-down transformer. It reverts to its role of step-up transformer when the converter operates as a 28 V/270 V converter. Since the bi-directional converter provides regulated output for the specified input voltage and load variation in both directions of conversion, the transformer rating and size must be increased, relative to a unidirectional converter transformer. However, the increase is very minimal as compared to two separate transformers of the same ratings, one for the 270 V/28 V conversion and another for the 28 V/270 V conversion. During the 270 V/28 V conversion mode, boost voltage is not required to provide a regulated 28 VDC. During the 28 V/270 V conversion mode, an extra voltage must be added to the output of bridge converter 43 to regulate to 270 VDC. This extra voltage is derived from the transformer boost winding 35.

Boost converter 42 is active during the 28 V/270 V conversion mode. The boost voltage required to be added with the output of bridge converter 43 is derived from transformer 44. Boost converter 42 comprises MOSFETs 60, 61, and diodes 64, 65. The switching devices, MOSFETs 60, 61, convert the AC boost voltage, derived from transformer 44, and add the converted DC boost voltage with the output of bridge converter 43 to provide regulated 270 VDC output.

A single filter inductor 46 attenuates output ripple in any mode of conversion, 270 VDC to 28 VDC or vice versa. Filter inductor 46, in this embodiment, is located on the low voltage side and has an extra winding clamped to the 270 VDC bus through a MOSFET transistor Q10, 59. The turns ratio of filter inductor 46 is the same as that of transformer 44, inclusive of the boost winding. Transistor Q10, 59 is turned on to discharge the energy stored in filter inductor 46 to the 270 VDC load when the MOSFET power transistors 53, 54 of push-pull converter 45 are turned off during step-up conversion and reduce the ripple voltage on 270 VDC. Filter inductor 46 also helps to reduce the ripple reflected back to the 28 VDC battery bus during step-up conversion.

MOSFET transistor Q7, 62 sandwiched in the boost converter 42 is turned on during step-down conversion (270 VDC to 28 VDC). The built-in diode 63 serves as a flywheel diode to flywheel the leakage energy associated with transformer 44 back to capacitor 41 of filter 46.

Power transistors Q5, 53 and Q6, 54 are turned on alternately. The conducting transistor is turned off when the peak current sensed through the transistor is equal to the output of the error amplifier. As a result, the average current in the output filter inductor 46 is proportional to the peak current through the transistor and thus is controlled directly by the error amplifier signal. For input voltage and load variations, the output of the error amplifier varies and the duty cycle varies as necessary to maintain the peak current through the transistor.

Figure 3:
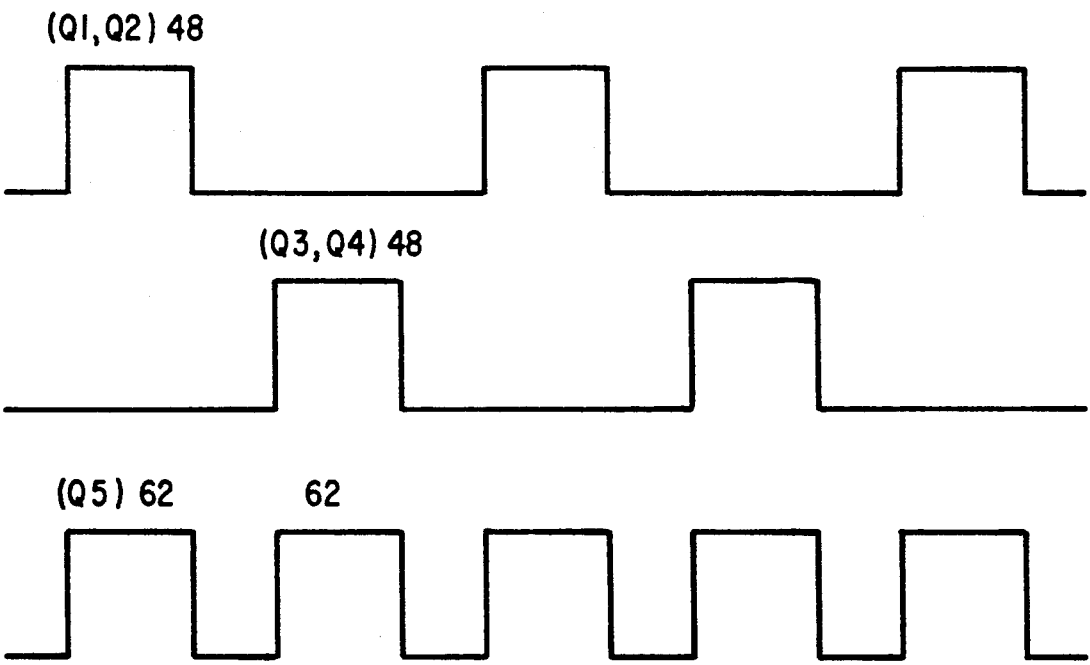
FIG. 3 illustrates a timing diagram of the switching sequence during step-down mode.

FIG. 3 illustrates a timing diagram of the switching sequence for 270 V/28 V conversion. When power transistors Q1 and Q2 are on, power transistors Q3 and Q4 are off. Power transistor Q7, 62 is on when either power transistors Q1, Q2 or Q3, Q4 are on.

Figure 4:
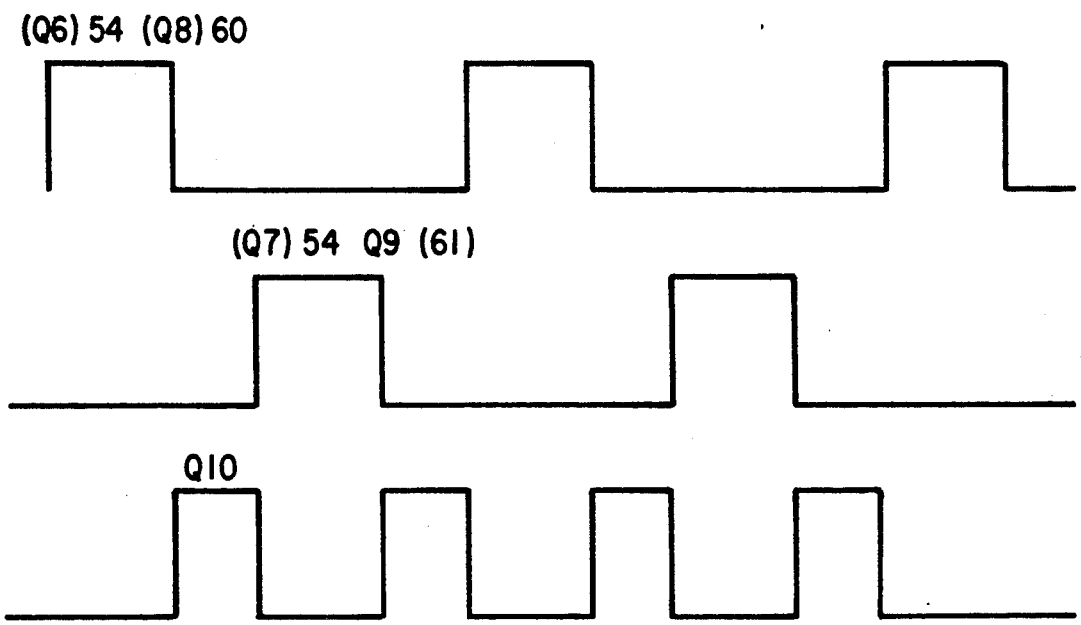
FIG. 4 illustrates a timing diagram of the switching sequence during step-up mode.

FIG. 4 illustrates a timing diagram of the switching sequence for 28 V/270 V conversion. When power transistors Q6, 54 and Q8, 60 are on, power transistors Q5, 53 and Q9, 61 are off. Power transistor Q10, 59 is on when neither power transistors Q6, 54 and Q8, 60 nor Q5, 53 and Q9, 61 is on.

It is not intended that this invention be limited to the hardware arrangement, or operational procedures shown disclosed. This invention includes all of the alterations and variations thereto as encompassed within the scope of the claims as follows.

I claim:

1. A bi-directional power converter comprising:
    input power means for receiving input power;
    circuitry means connected to said input power means capable of providing power conversion between 270 volts to 28 volts and power conversion between 28 volts to 270 volts;
    said circuitry means including bridge converter means, transformer means connected to said bridge converter means, push pull converter means connected to said transformer means, boost converter means connected to said input power means, said bridge converter means and said transformer means, and filter means connected to said push pull converter means and connected between said input power means and said boost converter means; and
    output means for providing power conversion output.

2. A bi-directional converter as claimed in claim 1 wherein said filter means is designed for dual functions, attenuating output ripple during output mode and reducing the reflected back harmonic current into the source during input mode.

3. A bi-directional converter as claimed in claim 1 wherein said bridge converter includes:
    dual function built in diode means across transistors.

4. A bi-directional converter as claimed in claim 3 wherein said dual function built in diode means function as flywheeling diodes during input mode and function as rectifiers during output mode.

5. A bi-directional converter as claimed in claim 1 wherein said output means provides a regulated power conversion output in two directions of conversion for a specified input voltage and load variation.

6. A bi-directional converter as claimed in claim 1 wherein said input power means receives input power of either 28 volts or 270 volts.

7. A bi-directional converter as claimed in claim 1 wherein said output means provides power conversion output of either 270 volts or 28 volts.

8. A bi-directional converter as claimed in claim 1 wherein said bridge converter means includes MOSFET power transistors utilized as switching elements.

9. A bi-directional converter as claimed in claim 1 wherein said push-pull converter means includes MOSFET power transistors utilized as switching devices.

10. A bi-directional converter as claimed in claim 1 wherein said transformer means operates as both a step-down transformer and a step-up transformer.

11. A bi-directional converter as claimed in claim 1 wherein said boost converter means rectifies boost voltage and sums rectified boost voltage with output of said bridge converter means.

12. A bi-directional converter as claimed in claim 1 wherein said circuitry means further includes:
step/down controller means;
step/up controller means; and,
protection circuit means.

13. A bi-directional converter as claimed in claim 12 wherein said step/down controller means and said step/up controller means regulates output voltage, monitors transistor peak current and with said protection circuit means, provides short circuit protection.

14. A bi-directional converter as claimed in claim 1 wherein said circuitry means further includes:
common controller means; and,
protection circuit means.

15. A bi-directional converter as claimed in claim 14 wherein said common controller means includes current mode control for control of said bridge converter means and said push pull converter means.

16. A bi-directional converter as claimed in claim 12 wherein said circuitry means further includes:
transfer circuit means to select conversion mode of said bi-directional converter.

* * * * *